United States Patent Office 3,356,654
Patented Dec. 5, 1967

3,356,654
COPOLYMERS OF HYDROXY DERIVATIVES OF CYCLIC UNSATURATED AMINO ACIDS
Kazys Sekmakas, Chicago, Ill., assignor to De Soto, Inc., a corporation of Delaware
No Drawing. Filed Feb. 18, 1966, Ser. No. 528,359
7 Claims. (Cl. 260—78.5)

This invention relates to new hydroxy derivatives of certain unsaturated amino acids and the production thereof as well as copolymers containing the same. The invention especially contemplates film forming aqueous emulsions of copolymerized ethylenically unsaturated materials, which emulsions deposit films which exhibit good adhesion to glossy or chalky surfaces and improved adhesion to surfaces previously coated with oil based paints, as well as improved water resistance. More particularly, the present invention contemplates copolymer emulsions of fine particle size in which the dispersed particles of the emulsion are constituted by particles of emulsion copolymers of monoethylenically unsaturated materials, which contain an hydroxy derivative of certain unsaturated amino acids in combination with other monoethylenic materials providing oxirane functionality.

Aqueous emulsions or latex paints are presently in wide use since they are inexpensive, apply easily with water cleanup after application, and the coatings dry rapidly with minimum odor. Unfortunately, and as is known, latex paints are subject to important disadvantages which have limited their utility and detracted from their potential value. Thus, available latex paints do not adequately adhere to previously painted surfaces which are glossy or chalky. Also, the deposited films lack desirable water resistant properties and the films do not adequately adhere to surfaces previously painted with oil based paints. When alkyd resins are used in combination to improve adhesion, water resistance is further impaired.

In accordance with the present invention, these disadvantages are overcome by employing aqueous emulsion copolymers or interpolymers of polymerizable monoethylenically unsaturated materials which include a small proportion of hydroxy derivatives of certain unsaturated amino acids. The presence of these hydroxy derivatives especially in combination with the presence of the oxirane group which may also be present in the interpolymer markedly alters the character of the aqueous emulsion copolymer to provide emulsion coating systems which exhibit good adhesion to glossy or chalky surfaces and improved adhesion to surfaces painted with oil based paints. Also, and despite water application, the deposited films resist water well even when alkyd resins are used to upgrade adhesion to chalked surfaces.

The term aqueous emulsion copolymer is used to denote copolymers or interpolymers produced by copolymerizing a liquid mixture of polymerizable monomers dispersed in aqueous medium in the form of finely divided particles of sufficient fineness (up to about 3 microns) to be stably dispersed in water. As is known, aqueous emulsion copolymers are of very high molecular weight and the emulsion copolymer feature of the invention is in no way related to copolymers of far lower molecular weight which may be produced by other polymerization techniques, such as suspension polymerization which produces polymer particles which are not stably suspended, solution polymerization or polymerization in bulk. Indeed, such copolymers are useless in the emulsions contemplated by the invention, though solution copolymers provide another and different feature of the invention.

First, the invention is based on the finding that valuable new polyfunctional monomers may be provided by reacting an aromatic mono-oxide with a monoethylenically unsaturated carboxy-functional derivative of ethylene urea or the like which retains amine functionality. Reference is made to my prior copending application Ser. No. 506,273, filed Nov. 3, 1965, in which an alkylene mono-oxide is used instead of an aromatic mono-oxide as required herein. While similar objectives are reached by the present invention, the reaction with aromatic mono-oxide as represented by styrene oxide is quite different, yielding certain advantages and disadvantages which will be pointed to hereinafter. With respect to the carboxy-functional derivative of ethylene urea, the invention will be illustrated particularly by the reaction of hydroxyethyl ethylene urea and maleic anhydride.

In the reaction of the hydroxy derivative of ethylene urea and the like with maleic anhydride or other dicarboxylic acid anhydride, the anhydride group reacts with the hydroxy group of the ethylene urea derivative in order to provide a monomeric product which retains one of the carboxyl functionalities of the anhydride and the amine functionality of the ethylene urea derivative. This reaction is more fully described in United States Patent 3,194,792, the disclosure of which is hereby incorporated by reference.

In accordance with the present development, it has been found that the unsaturated amino acid of the prior art can be reacted with aromatic mono-oxide which preferentially reacts with the amino group and not with the carboxyl group of the ethylene urea derivative, so that the carboxyl functionality is retained and the product is essentially monomeric. By introducing the aromatic ring into the carboxyl amine molecule, the water solubility properties are decreased to a great extent. This introduces hydroxy functionality and amine functionality remains when only partially consumed. There is thus formed a mixture of ethylenically unsaturated copolymerizable monomers containing carboxyl, amine and hydroxy functionalities. The avoidance of gelation is based on the surprising selectivity of the aromatic oxide reaction.

From the broad standpoint, the aromatic mono-oxide is reacted with an amino acid having the formula:

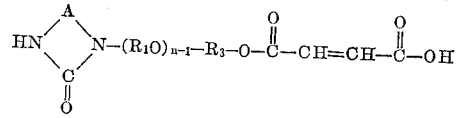

where:

$R_1$ is a $(C_2\text{–}C_3)$ alkylene group;
$R$ is a $(C_2\text{–}C_8)$ alkylene group;
$A$ is a $(C_2\text{–}C_3)$ alkylene group; and
$n$ is an integer having a value of 1 to 10.

As will be understood from the foregoing, when the aromatic mono-oxide is reacted with the amino acid as previously described, the amino hydrogen atom is replaced by Q—OH where Q is the residue of aromatic mono-oxide which carries the hydroxy group generated by the reaction thereof with the amino hydrogen atom.

The products of the reaction, therefore, include:

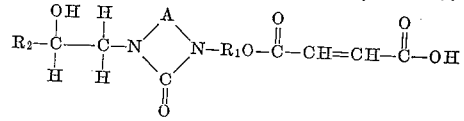

where $R_1$ is a $(C_2\text{–}C_3)$-alkylene group; $A$ is a $(C_2\text{–}C_3)$-alkylene group; and $R_2$ is an aryl, alkaryl, or a halogen-substitution product thereof. The preferred alkyl substituent is a $C_1\text{–}C_4$ alkyl group and the preferred halogen is chlorine which may be substituted in the aromatic ring or in the alkyl group.

Styrene oxide and vinyl toluene oxide are particularly contemplated as examples of aromatic mono-oxide in accordance with the invention.

The reaction of the amino hydrogen atom may be incomplete leaving unsaturated

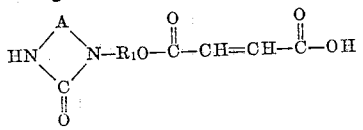

Similarly, the acid functionality may be and preferably is at least partially consumed by reaction with alkylene mono-oxide as discussed hereinafter.

The preferred products are produced from the following amino acid:

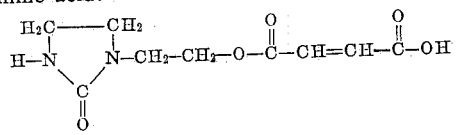

It is also permissible to employ a proportion of alkylene mono-oxide which preferentially reacts with the carboxyl group. In this respect, the disclosure of said application Ser. No. 506,273 is hereby incorporated by reference. From the standpoint of preferred practice, this introduces a proportion of:

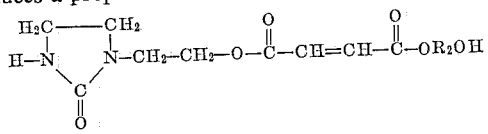

in which R is the residue of the alkylene mono-oxide, preferably ethylene, 1,2-propylene and 1,2-butylene radicals.

Similarly, some of the alkylene mono-oxide can react with the residual carboxyl functionality in the adduct formed by reaction of the aromatic oxide with amino hydrogen. Using styrene oxide and propylene oxide, this would provide:

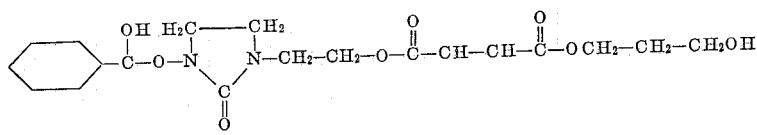

which illustrates a preferred compound within the class contemplated.

In this way, one can balance the hydrophilic and hydrophobic properties and increase the hydroxy functionality while retaining any desired amine functionality. It is particularly preferred to employ a mixture in which the alkylene mono-oxide reaction product constitutes at least 80% of the mixture with the product which is reacted only with the aromatic mono-oxide.

Especially in the presence of an alkaline catalyst typically illustrated by benzyl trimethyl ammonium chloride, the alkylene oxide reacts with the carboxyl group and not with the amino group of the ethylene urea derivative so that the amine functionality is retained and the product is essentially monomeric. This is demonstrated by a decrease in acid value commensurate with the amount of oxide used. Similarly, the aromatic oxide reacts with the amino group, and not with the carboxyl group and the product is, again, monomeric. This is demonstrated by the achievement of hydroxyl functionality without significant decrease in acid value. While alkaline catalysis of the reaction is not essential, since the amino group on the amino acid provides sufficient basicity to carry out the process in the absence of alkaline catalysis, the reaction is made more rapid by the presence of alkaline catalysts. While benzyl trimethyl ammonium chloride is a particularly preferred catalyst, any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred amines.

The alkaline catalyst is conveniently present in an amount of from 0.1–1.0% by weight, based on the weight of the amino acid reactant.

While numerous monoethylenically unsaturated carboxylic acid amines are disclosed in United States Patent 3,194,792, and while the invention accommodates all of the products of this character referred to in said patent, it is particularly preferred to use the hydroxyethyl derivative of ethylene urea which is conveniently produced by reacting equimolar proportions of urea with aminoethyl ethanol amine. Again, and while monoethylenically unsaturated dicarboxylic acid anhydrides are available for coreaction with the cyclic hydroxy amine product, maleic anhydride is particularly preferred, the hydroxy derivative of ethylene urea being reacted with maleic anhydride in equimolar proportions to form the unsaturated carboxylic acid amine.

While the present invention includes the new hydroxy amine derivatives which have been produced and the production thereof as well as polymers and copolymers of from 0.1–20% by weight of this polyfunctional product with the balance of the addition polymer being other ethylenically unsaturated material copolymerizable therewith, especially monomers containing the $CH_2=C<$ group such as methyl methacrylate, ethyl acrylate, butyl acrylate, styrene, vinyl toluene, acrylonitrile and the like, an important feature of the invention is certain emulsion copolymers or interpolymers with oxirane-containing monomers having important new properties.

Referring first to the broad area of copolymers which may be produced in accordance with the present invention, the unsaturated hydroxy amines which are produced in accordance with the invention are copolymerized with numerous other ethylenically unsaturated materials to form copolymers in which both the amine and the hydroxy functionality of the unsaturated hydroxy amine derivatives of the invention can be relied upon to provide thermosetting properties. This is especially true when the copolymer is a solution copolymer and includes other copolymerized materials providing reactive groups as are provided by hydroxy-containing ethylenic monomers or oxirane-containing ethylenic monomers. In these copolymers the unsaturated hydroxy-amine derivatives of the invention are desirably present in an amount of from 0.5% to 20% by weight, more preferably from 2–15% by weight. The hydroxy functional monomers are desirably present in an amount of from 2–30% by weight, preferably from 4–15% by weight. The oxirane-functional monomers are desirably present in an amount of from 0.5–20% by weight, preferably from 2–15% by weight.

The preferred hydroxy-functional monomers are illustrated by 2-hydroxy ethyl and 2-hydroxy propyl acrylate and methacrylate, though these are merely illustrative of the class which also includes other hydroxy alkyl methacrylates and acrylates such as 3-hydroxy propyl methacrylate, 4-hydroxy butyl methacrylate and the corresponding acrylates. Still further hydroxy-containing monomers which may be used are ethylene glycol allyl ether, propylene glycol allyl ether, butylene glycol allyl ether, diethylene glycol allyl ether, trimethylol propane allyl ether and 2-hydroxy-methyl-5-norbornene (either the endo isomer or the exo isomer or mixtures thereof). Still further, allyl alcohol, methallyl alcohol, crotyl alcohol and unsaturated fatty alcohols corresponding to drying oil fatty acids may be used.

The oxirane-containing monomers which may be used to provide thermosetting properties to the solution copolymers which are contemplated are the same as those which are used in the emulsion copolymers referred to hereinafter.

With respect to the aqueous emulsion interpolymers, these are formulated to include from 0.1–5% by weight, based on the total weight of copolymerizable material, of the unsaturated hydroxy amine product referred to. While 5% is a preferred maximum, up to 15% of the hydroxy amine product may be tolerated, though this is wasteful.

The oxirane containing monoethylenically unsaturated material is a monomeric compound preferably illustrated by glycidyl acrylate or glycidyl methacrylate and mixtures thereof though other monomers such as allyl glycidyl ether, glycidyl vinyl ether, and dipentene monoxide may also be used. The oxirane containing material is used in small amounts and preferably in proportions of about 0.2–5% by weight, based on the total weight of copolymerizable material, though as little as 0.1% has some effect and about 15% may be tolerated. The oxirane material functions to provide, in combination with the amino alcohol, the superior water resistance, wet adherence and adherence to glossy and oil painted surfaces which are the objectives of the invention. It is particularly preferred that the oxirane material be ammoniated or aminated. More preferably, the oxirane containing material is used in proportions of from 1–3% by weight.

The oxirane groups of the copolymer are preferably reacted with aminating and/or ammoniating agents to form the emulsion copolymers of the present invention. Apparently, the aminating and/or ammoniating agents react with the oxirane ring to cause the same to open, a hydrogen atom from the aminating or ammoniating agent combining with the oxygen atom to form an hydroxyl group, and the residue of the agent is directly attached to the remaining carbon atom of the oxirane ring.

The remainder of the emulsion copolymer consists essentially of at least one other monoethylenically unsaturated monomer, preferably one having no functional group other than the $CH_2=C<$ group. The numerous materials which may be used either alone or in mixtures are illustrated by methyl acrylate, ethyl acrylate, methyl methacrylate, butyl acrylate, styrene, 2-ethylhexyl acrylate, vinyl toluene, vinyl acetate, acrylonitrile, vinylidene chloride, etc. Small proportions, up to 5% by weight, of materials having a functional group other than the ethylenic group such as acrylic acid, acrylamide, methylol acrylamide, aminoacrylates or hydroxyethyl acrylate may also be present but, and with the exception of up to about 5% of unsaturated acid, monomers supplying other functional groups should be limited to amounts less than 3% by weight.

It is preferred that the monomers be selected to provide a copolymer having a glass transition temperature below room temperature so that the copolymer particles will coalesce by themselves without the necessity of applying external heat. However, the monomers can be selected to provide a copolymer having a higher glass transition temperature and higher boiling water miscible solvents may be used as taught in United States Patent 3,032,521. Water immiscible solvents, such as butyl Cellosolve acetate, can also be used.

While the present invention primarily contemplates aqueous emulsions which will provide flat-appearing coatings, a degree of surface gloss may be provided as taught in my copending application Ser. No. 440,628, filed Mar. 17, 1965.

It is desired to point out that emulsion polymerization is difficult to carry out with the water soluble alkylene oxide reaction products of my said prior application. The present development through the use of styrene oxide and the like decreases water solubility thereby minimizing homopolymerization, plating, and kickout problems. Water insoluble compounds emulsify much more readily and this results in a more uniform product and seeding, plating, and graininess problems are eliminated.

The details of the preferred emulsion copolymerization are set forth in my copending application.

The emulsion copolymers of the present invention preferably contain ammoniated oxirane groups, aminated oxirane groups or both. This ammoniation or amination reaction provides an emulsion coating composition which exhibits the improved properties discussed hereinbefore.

The amination or ammoniation reaction is preferably conducted after copolymerization, though less desirably the oxirane containing material may be aminated or ammonated prior to copolymerization.

The agents which may be used in the ammoniating or aminating reaction are preferably ammonium hydroxide or simple aliphatic primary and secondary monoamines such as 1 to 4 carbon atom alkyl and alkanol amines such as monoethanol amine. Both agents are preferably used in water solution. Ammonium hydroxide atnd is particularly preferred because it is relatively inexpensive. Ammonia may also be used but this is less desirable. Other monoamines which may also be used are illustrated by tertiary butyl amine, ethyl amine, tertiary actyl amine, diethanolamine, dimethyl amine, methyl ethyl amine, etc. While mixtures of these agents may be used, it is preferred to use one for ease of production.

As would be evident, the ammoniating reaction with ammonium hydroxide is preferably conducted at room temperature so as not to cause extensive generation of ammonia.

The ammoniating and aminating agents are preferably used in sufficient proportion to cause ammoniation or amination of substantially all the oxirane groups carried by the oxirane containing material.

The invention is illustrated in the examples which follow in which all parts are by weight.

*Example 1.—Preparation of ethylenically unsaturated hydroxyl amino compound*

| Grams | | |
|---|---|---|
| 729 (7 moles) | Amino Ethyl Ethanolamine. | ⎫ Heat to 240° F.–250° F. in 1½ hrs. using agitation and light nitrogen sparge. Hold for 1 hour. Then, increase temperature to 390–400° F. in 2 hrs. Hold for one hour. (Theoretical loss of $NH^3$: 238 gr. Actual loss: 242 gr.). |
| 420 (7 moles) | Urea | |
| 686 (7 moles) | Maleic Anhydride. | Add. Heat to 250° F. Hold for 2 hrs. to provide an acid value of 190. Add. |
| 390 | 4-Ethoxy Ethanol. | |
| 5 | Benzyl Trimethyl Ammonium Chloride. | |
| 840 | Styrene Oxide | Add styrene oxide over 1 to 1½ hrs. at 250–260° F. Hold for 2 hrs. Acid Value: 107. |

Final characteristics:
Solids (theoretical) _____percent__ 84.2
Solids (actual) _____do____ 83.4
Viscosity (Gardner-Holdt) _____ Z
Acid value (theoretical) _____ 132
Acid value (actual) _____ 107

Example 2

Example 1 was repeated and alkylene oxide was introduced in order to eliminate acid carboxylic groups from amino acid.

| Grams | | |
|---|---|---|
| 729 (7 moles) | Amino Ethyl Ethanolamine. | Heat to 240° F.–250° F. in 1½ hrs. using agitation and light nitrogen sparge. Hold for 1 hour. Then, increase temperature to 390–400° F. in 2 hrs. Hold for one hour. (Theoretical loss of $NH^3$: 238 gr. Actual loss: 242 gr.). |
| 420 (7 moles) | Urea | |
| 686 (7 moles) | Maleic Anhydride. | Add. Heat to 250° F. Hold for 2 hrs. to provide an acid value of 190. |
| 390 | 2-Ethoxy Ethanol. | Add |
| 5 | Benzyl Trimethyl Ammonium Chloride. | |
| 840 | Styrene Oxide | Add styrene oxide over 1 to 1½ hrs. at 250–260° F. Hold for 2 hours. Acid value: 107. |
| 504 | Butylene Oxide | Add over 1½ hrs. at 240–250° F. Hold for Acid Value of 10. |

Final characteristics:
- Solids _____ percent__ 83.7
- Acid value _____ 11.4
- Viscosity _____ $Z_3$–$Z_4$ In Table I, the compositions of the nitrogen products which contain different amounts of styrene oxide are listed. Resins of Examples 3 and 4 were prepared using the same procedure as described in Example 2.

TABLE I

| | Ex. 1 | Ex. 4 | Ex. 3 | Ex. 4 |
|---|---|---|---|---|
| Charge Composition (moles): | | | | |
| Amino Ethyl-Ethanol Amine | 7 | 7 | 7 | 7 |
| Urea | 7 | 7 | 7 | 7 |
| Maleic Anhydride | 7 | 7 | 3½ | 2.33 |
| Styrene Oxide | 7 | 7 | 7 | 7 |
| Butylene Oxide | 0 | 7 | | |
| Final Characteristics: | | | | |
| Solids (percent) | 83.4 | 83.7 | 83.0 | 80.3 |
| Acid Value | 107 | 11.4 | 12.4 | 11.3 |
| Viscosity (Gardner) | $Z_5$ | $Z_3$–$Z_4$ | $Z_2$ | $Z_1$ |

Example 5.—Preparation of solution polymer

| Grams | | |
|---|---|---|
| 230 | 2 Ethoxy Ethanol | Charge into reactor. Heat to 210° F. |
| 250 | Product of Example 3 | |
| 100 | 2 Ethoxy Ethanol | Premix and add over 2½ hrs. to reactor at 210° F. Hold for 2 hours. |
| 180 | Ethyl Acrylate | |
| 60 | Hydroxy Ethyl Acrylate | |
| 40 | Glacial Methacrylic Acid | |
| 75 | Styrene | |
| 10 | Benzoyl Peroxide | |
| 5 | Tertiary Dodecyl Mercaptan | |
| 2 | Benzoyl Peroxide | Add. Hold for 2 hours. |
| 2 | ____do____ | Add. Hold for 2 hours at 210–220° F. |

Final characteristics:
- Solids _____ percent__ 48.0
- Viscosity (Gardner-Holdt) _____ Z–$Z_1$ A film of this interpolymer is baked ten minutes at 350° F. on tin panel (film thickness—1 mil.). The film was xylol resistance, is very flexible and adherent.

Example 6.—Preparation of emulsion polymer

| Grams | | |
|---|---|---|
| | A | |
| 1,620 | Water | Charge into reactor equipped with an agitator, reflux condenser, thermometer, and nitrogen inlet tube. Heat to 170° F. |
| 3 | Sodium Bicarbonate | |
| 9 | Potassium Persulfate | |
| | B | |
| 1,600 | Water | Dissolve surfactants in 200 grams of water using fast speed agitation, add product of Example 2. |
| 24 | Sodium Lauryl Sulfate | |
| 72 | Nonylphenoxy Polyethylene Ethanol. | |
| 131 | Product of Example 2 | |
| | C | |
| 1,920 | Ethyl Acrylate | Premix monomers and add to "B" using fast speed agitation. Add ingredients "B" + "C" to reactor containing "A", over 2½ hours, at 170–175° F. Hold for one hour at 175° F. Cool to 90° F. |
| 930 | Methyl Methacrylate | |
| 15 | Glycidyl Methacrylate | |
| 30 | Glacial Methacrylic Acid | |
| | D | |
| 75 | Ammonium Hydroxide (28%) | Add "D" to emulsion ot adjust pH to 9.0–10.0 using agitation. Strain through cheesecloth. |

Final characteristics:
- Solids _____ percent__ 47.6
- Viscosity _____ cps__ 28
- pH _____ 9.8
- Grain in the film _____ None
- Plating in reactor _____ None

EVALUATION IN EMULSION PAINT

In the tests, wooden trim panels are painted with a standard zinc oxide pigmented linseed oil exterior house paint, and the painted panels are exposed to the weather for nine months, rendering them chalky and difficult to overcoat with emulsion paints. The panels are then wiped with a dry rag to remove surface dirt and the like and are then repainted with the emulsions under test.

The repainted panels are then submerged in water for 18 hours, and the wet panels are frozen in a freezer to below the freezing point of water and then thawed to room temperature to provide a single test cycle. This test cycle is then repeated several times and adhesion is measured after each cycle by rubbing the coating vigorously with the finger to determine whether the paint comes off the panels.

In Table II, the overall ratings of the coatings are numerically evaluated as follows:

- Poor _____ 0–25
- Fair _____ 25–50
- Good _____ 50–75
- Very good _____ 75–85
- Excellent _____ over 85

Utilizing the same procedure as described in Example 6, additional emulsion interpolymers are prepared utilizing different styrene oxide adducts:

TABLE II
[Emulsion composition]

| | Ex. 6 | Ex. 7 | Ex. 8 | Ex. 9 | Ex. 10 | Ex. 11 | X |
|---|---|---|---|---|---|---|---|
| Styrene Oxide (percent) | 3.5 | 3.5 | 3.5 | 3.5 | | | |
| Adduct of Example (see Table I) | #1 | #2 | #3 | #4 | | | |
| Glycidyl Methacrylate (percent) | 0.5 | 0.5 | 0.5 | 0.5 | 0.5 | | |
| | Wet Adhesion Properties | | | | | | |
| 1 Cycle | 85 | 85 | 85 | 45 | 30 | 10 | 20 |
| 5 Cycles | 10 | 50 | 45 | 20 | 10 | 10 | 10 |

In connection with the above evaluation of the present invention, comparison has been made with the best available competitive emulsion material known to me, and which is identified by the letter X. The chemical constitution of this competitive material is not specifically known to me.

As will be evident for Table II, the presence of both the oxirane containing compound and styrene oxide adduct, are required in order to provide significant superiority. This illustrates how the presence of functional groups markedly alters the characteristics of the emulsion interpolymer.

The invention is defined in the claims which follow.

I claim:

1. A solution copolymer comprising from 0.5 to 20% by weight of the copolymer of the compound having the formula:

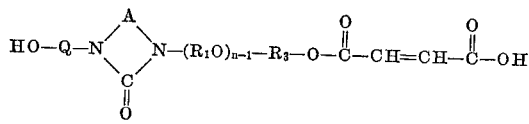

where:
$R_1$ is a ($C_2$–$C_3$) alkylene group;
$R_3$ is a ($C_2$–$C_8$) alkylene group;
A is a ($C_2$–$C_3$) alkylene group;
$n$ is an integer having a value of 1 to 10; and
Q is the residue of aromatic mono-oxide at least one copolymerizable monomer containing a single $CH_2=C<$ group and carrying a functional group selected from the group consisting of hydroxy functionality and oxirane functionality, and at least one further copolymerizable monomer containing a single $CH_2=C<$ group.

2. An aqueous emulsion copolymer consisting essentially of from 0.1 to 15% by weight of the copolymer of the compound having the formula:

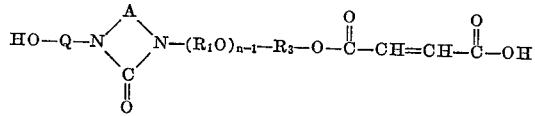

where:
$R_1$ is a ($C_2$–$C_3$) alkylene group;
$R_3$ is a ($C_2$–$C_8$) alkylene group;
A is a ($C_2$–$C_3$) alkylene group;
$n$ is an integer having a value of 1 to 10; and
Q is the residue of aromatic mono-oxide and at least one copolymerizable monomer containing a single $CH_2=C<$ group and copolymerizable with said compound in aqueous emulsion.

3. An aqueous emulsion copolymer consisting essentially of from 0.1 to 5% by weight of the copolymer of the compound having the formula:

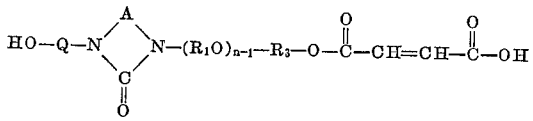

where:
$R_1$ is a ($C_2$–$C_3$) alkylene group;
$R_3$ is a ($C_2$–$C_8$) alkylene group;
A is a ($C_2$–$C_3$) alkylene group;
$n$ is an integer having a value of 1 to 10; and
Q is the residue of aromatic mono-oxide from 0.1 to 5% by weight of the copolymer of at least one monethylenically unsaturated compound supplying oxirane functionality to said copolymer and at least one copolymerizable monomer containing a single $CH_2=C<$ group and copolymerizable with said compound in aqueous emulsion.

4. The copolymer of claim 3 in which said copolymer is reacted with ammonia or a volatile amine.

5. The copolymer of claim 3 in which said aromatic mono-oxide is selected from the group of styrene oxide and vinyl toluene oxide.

6. The copolymer of claim 3 in which at least a portion of the carboxyl groups in said compound are reacted with alkylene mono-oxide containing from 2–8 carbon atoms or a halogen substitution product thereof.

7. The copolymer of claim 2 in which said compound has the formula:

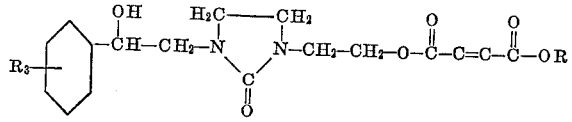

in which R is hydrogen or the residue of amono-oxide selected from the group consisting of ethylene oxide, 1,2-propylene oxide and 1,2-butylene oxide; and in which $R_3$ is selected from hydrogen and methyl.

References Cited

UNITED STATES PATENTS 3,194,792   7/1965   Emmons _____ 260—78.5

SAMUEL H. BLECH, *Primary Examiner.*

W. J. BRIGGS, *Assistant Examiner.*